United States Patent [19]
Tamura et al.

[11] 3,917,503
[45] Nov. 4, 1975

[54] APPARATUS FOR PRESSING LAMINATED ASSEMBLIES

[75] Inventors: Yuhei Tamura, Tokyo; Osamu Shiozuka, Yokohama; Toshihiko Iwasaki, Tokyo; Yoshio Fujimura, Yokohama; Kenzo Abe, Tokyo, all of Japan

[73] Assignee: Asahi Glass Company, Ltd., Tokyo, Japan

[22] Filed: Jan. 24, 1974

[21] Appl. No.: 436,031

[30] Foreign Application Priority Data
Jan. 25, 1973  Japan.............................. 48-10541

[52] U.S. Cl................ 156/382; 100/152; 100/211; 156/104; 156/286; 156/499; 156/538; 198/134; 198/153
[51] Int. Cl.²..................... B32B 17/00; B32B 31/00
[58] Field of Search........... 156/104, 286, 381, 382, 156/499, 99, 105, 285, 538; 100/211, 144, 152; 53/22 B, 112 B, 187, 384; 198/134, 198/153; 229/62, 65

[56] References Cited
UNITED STATES PATENTS

| | | | |
|---|---|---|---|
| 1,399,415 | 12/1921 | Taliaferro | 198/134 |
| 2,552,101 | 5/1951 | Lisch Jr. et al. | 198/134 |
| 2,994,629 | 8/1961 | Richardson | 156/104 |
| 2,996,416 | 8/1961 | Boicey et al. | 100/211 |
| 3,159,096 | 12/1964 | Tocher | 229/62 |
| 3,289,814 | 12/1966 | Rosema | 198/134 |
| 3,605,992 | 9/1971 | Weber | 198/134 |

*Primary Examiner*—Clifton B. Cosby
*Assistant Examiner*—John E. Kittle
*Attorney, Agent, or Firm*—Oblon, Fisher, Spivak, McClelland & Maier

[57] ABSTRACT

Apparatus for pressing laminated assemblies, including a plurality of glass plates having a layer of bonding material interposed therebetween, for preliminarily bonding the same includes feeding means for inserting the laminated assemblies in bags, a conveyer supporting a plurality of the bags and connected to a vacuum pump, bag opening and closing means provided at one side of the conveyer, pressure reducing control means connected to the bags for imparting vacuum conditions to the bags during the time the bags are conveyed from the feeding means to discharging means, heating means for heating the bags under the vacuum conditions, and discharging means for removing the laminated assemblies.

6 Claims, 8 Drawing Figures

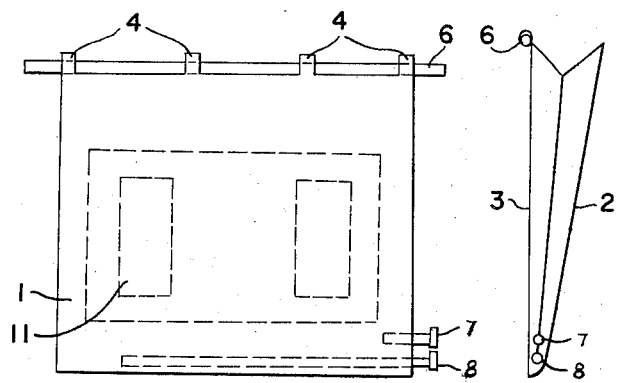
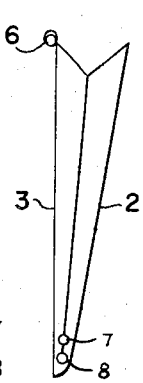
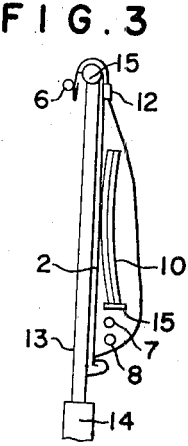
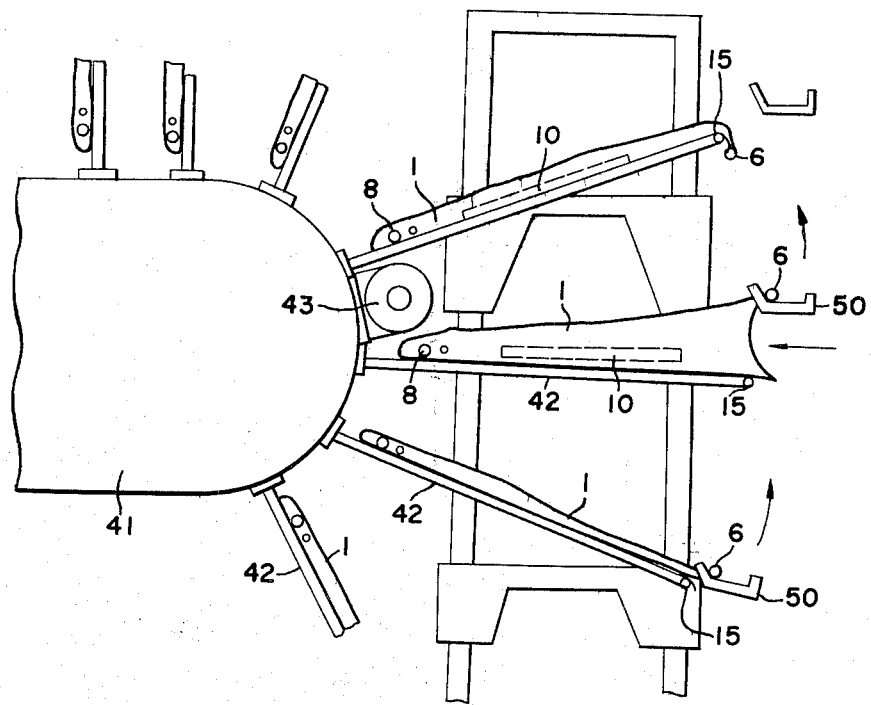

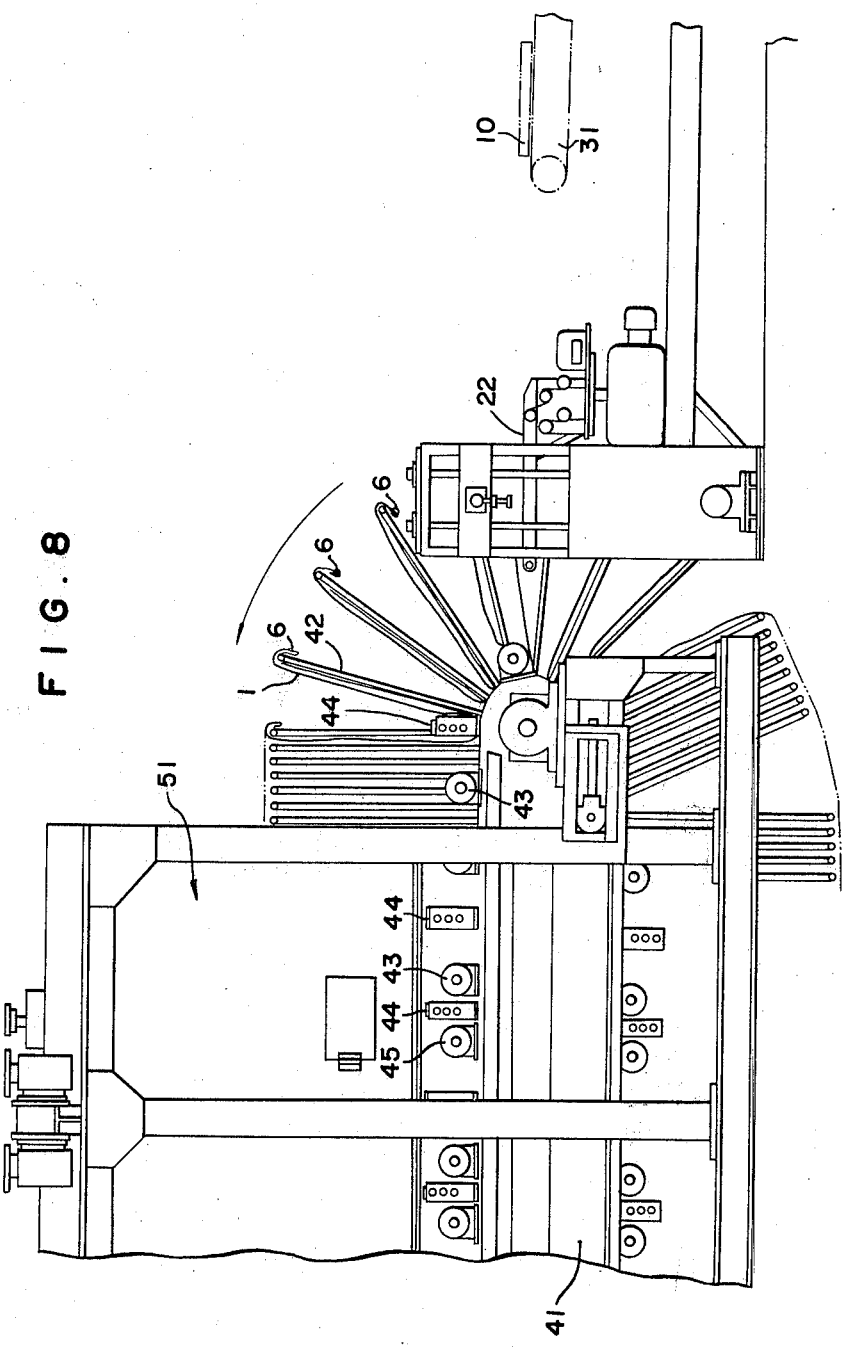

APPARATUS FOR PRESSING LAMINATED ASSEMBLIES

BACKGROUND OF THE INVENTION

1. Field of the Invention

The present invention relates to apparatus for pressing laminated assemblies, of a plurality of glass plates having an intermediate layer of bonding material, in the preparation of laminated glass, and more particularly to apparatus which automatically accomplishes the loading and unloading of the assemblies within bags for accomplishing the preliminary bonding steps.

2. Description of the Prior Art

Heretofore, it has been known to prepare laminated glass by bonding together two or more glass plates having a layer of bonding material, such as for example, polyvinylbutyral, interposed therebetween. In the conventional preparation of laminated glass, laminated assemblies with the intermediate layer of bonding material is pressed so as to impart a preliminary bonding thereto and to heat such assemblies at a temperature within the range of 100°C – 150°C and under a pressure within the range of 7 – 15 kg/cm² within an autoclave, so as to bond them.

However, in the preliminary bonding step, the laminated assemblies have been heretofore inserted within a bag by manual operations, whereby the productivity has been substantially low and a substantial amount of manual labour has been required. In addition, further disadvantages of such apparatus is inherent in the unsafe conditions prevailed upon the operators due to accidental breakage of the glass assemblies, and the waste of such assemblies due to such breakage.

SUMMARY OF THE INVENTION

Accordingly, it is an object of the present invention to provide an apparatus for pressing laminated assemblies which is able to insert the same within a bag by a continuous and automatic operation.

Another object of the present invention is to provide an apparatus for pressing laminated assemblies which accurately operates to insert the laminated assemblies within the bag and to impart vacuum treatment thereto.

Still another object of the present invention is to provide an apparatus for pressing laminated assemblies which employs automatic feeding means for inserting the laminated assemblies without any danger of breakage of the glass plates.

Yet another object of the present invention is to provide an apparatus for pressing laminated assemblies wherein a bag containing the laminated assemblies is under vacuum conditions when within a predetermined region during the rotary movement of a transfer conveyor.

The foregoing objects are achieved according to the present invention through the provision of an apparatus for pressing laminated assemblies which comprises feeding means for inserting the laminated articles within each of the bags, a conveyer supporting a plurality of the bags and which is connected to suitable pressure reducing means, bag opening and closing means provided at one side of the conveyor, pressure reducing control means connected to the bags for imparting vacuum conditions to the bags during the time in which the bags move from the feeding means to discharging means, heating means for heating the bags under vacuum conditions, and discharging means for removing the laminated assemblies from the bags.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views and wherein:

FIG. 1 is a front view of a bag utilized within the apparatus of the present invention;

FIG. 2 is a side view of the bag of FIG. 1;

FIG. 3 is a schematic view of the bag of FIG. 1 when closed and containing laminated assemblies;

FIG. 4 is a schematic view of the bag opening means of the apparatus of the present invention;

FIG. 8 is a partialy schematic view of an enlarged portion of FIG. 6.

DETAILED DESCRIPTION OF THE PREFERRED EMBODIMENTS

Figure 5:
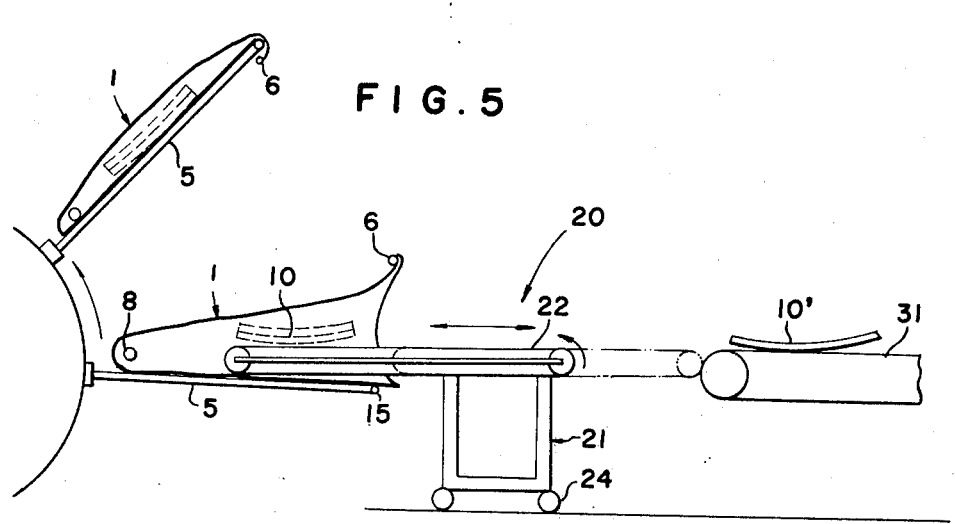
FIG. 5 is a schematic view of the automatic feeding means of the apparatus of the present invention.

Referring now to the drawings, the apparatus of the present invention utilized for pressing laminated assemblies broadly includes automatic feeding means, bag opening means, bag closing means, bag pressure reducing means, heating means, and discharging means. The bag utilized within the apparatus is a pressure reducible bag which is suitable for having the laminated assemblies automatically inserted within and withdrawn therefrom, and has a closable structure which includes a rod disposed upon at least one end of the bag, which is made of an airtight fabric, whereby the access opening of the bag can be closed by overlapping both of the inner surfaces of the fabric defining the opening. The bag additionally includes a port, connected to a pressure reducing means, such as for example, a vacuum pump, at the lower portion thereof.

As more particularly seen in FIGS. 1–3 the pressure reducible bag is made of a flexible airtight fabric 1, such as for example, rubber, a rubber coated fabric, a resin coated fabric, a plastic film, or the like, and a rod 6 is fitted at one end of the rear sheet 3 defining the bag 1, the rod 6 being placed upon sheet 3 only so as to facilitate separation of the rear sheet 3 from the front sheet 2 and thereby permit the bag 1 to be opened. A laminated assembly article 10 may be inserted through the access opening of the bag 1 whereupon the rear sheet 3, having the rod 6 associated therewith, may be moved toward the front sheet 2 so as to overlap the inner surfaces of such sheets due to the weight of the rod 6, as may be seen in FIG. 4. The rod 6 has a length which is greater than the width of the sheets 2 and 3 defining the access opening of the bag 1 so as to project beyond both sides of the sheets, and the opening and closing operations of the bag 1 can be performed by suitably moving the projecting ends of the rod 6.

Within the interior portion of the bag 1, pads 11 can be bonded upon the inner surfaces of sheets 2 and 3 so as to facilitate the insertion of the article therewithin, protect the same when inserted within the bag, and to smoothly facilitate the performance of the pressure reducing operation. In addition, it is also possible to place a support means 15 within the bag 1 for maintaining the article in a stable position. The bag 1 is further provided with a port 8, disposed in the lower portion of the bag for connecting to the bag a suitable pressure reducing means, such as for example, a vacuum pump, by which air within the bag may be evacuated so as to attain vacuum conditions therewith. A port 7 is also provided for connecting the bag to an auxiliary pressure reducing means which also serves to maintain the vacuum conditions in conjunction with the main pressure reducing means. The ports of the pressure reducing means are usually connected to the vacuum pumps through means of switching valves or the like, not shown, so as to evacuate or permit inflation of the bag as desired.

The structure of the pressure reducible bag is such that easy overlapping of both inner surfaces of the front sheet 2 and the rear sheet 3 in the vicinity of the access opening is attained. The structure may of course alternatively be such that the front sheet 2 and the rear sheet 3 may be overlapped along one side of the bag, or as a further alternative, a pleat may be provided at one or both sides of the bag. The rod 6 can be fitted upon either the front or rear sheet or upon both sheets, and it is also possible to secure a rubber band 12 at each end of the front and rear sheets within the vicinity of the access opening so as to secure the front and rear sheets 2 and 3 together without creasing the bag. In order to facilitate opening and closing of the bag, the bag 1 may be fitted upon a peg 13 which is mounted upon a base 14. When laminated assemblies 10 are to be inserted within the bag, the rod 6 disposed upon the end of the rear sheet 3 is moved so as to separate the rear sheet 3 from the front sheet 2 thereby opening the access opening of the bag whereby the assemblies 10 may be inserted therein. When the bag is to be closed, the rod 6 is moved toward the front sheet 2 whereby the rear sheet 3 is disposed over the front sheet 2, the end portions of such sheets being in an overlapped condition. The bag can of course be opened by moving the rod 6 in the opposite direction.

Reference now being made to FIG. 5, the automatic feeding means, generally indicated by the reference character 20, for inserting a laminated glass assembly within the bag 1 will now be disclosed, and it should be noted here that the automatic discharging means can have a similar structure. The automatic feeding means 20 includes a reciprocating fork 21 having associated therewith a conveyer which is intermittently driven. The fork is moved toward the opening of the bag and the laminated assembly article disposed upon the fork is inserted within the bag by driving the conveyor in the forward direction, the fork being subsequently moved in the opposite direction so as to leave the laminated assembly article within the bag. When the velocity of the fork is substantially the same as the velocity of the conveyer, the insertion of the article can be smoothly accomplished.

The reciprocating movement of the fork 21 is preferably conducted between the end of a feeding endless belt conveyor 31 and the opening of the bag 1. The article 10 is transferred from the feeding conveyor 31 to the belt fork conveyor 22 by suitably operating both of the conveyers. The movement of the fork conveyor 22 is usually terminated during the movement of the fork 21, however it is possible to drive the fork conveyer 22 at a velocity corresponding to the movement of the fork 21. In order to insert the article 10 within the bag, the end 23, of the fork conveyer 22, closest to the bag 1, is moved into the opening of the bag 1, the laminated assembly article 10 being of course held upon the conveyer 22, and the reciprocating movement of the fork 21 being conducted upon a suitable table and facilitated by means of wheels 24.

The velocity of the reciprocating movement, the time and position for stopping the fork 21 and the conveyer 22 at the end of the feeding conveyer 31 and at the opening of the bag 1, and the velocity of the rear movement, are preferably controlled, together with the movement of the laminated assembly article 10 upon the conveyer 22, by means of an automatic controlling apparatus. The fork 21 is also preferably movable in the vertical direction so as to adjust the level of supporting the laminated assembly article. The control of the driving velocity of the conveyer 22 upon the fork 21 toward the bag and the movement of the fork 21 in the opposite direction can be conducted by similarly employing an automatic controlling apparatus or a transmission controlling apparatus whereby the laminated assembly article 10 upon the conveyer 22 is maintained within the opening of the bag.

After transferring the laminated assemblies 10 from the conveyer 22, the fork 21 is returned to a position adjacent to or contacting the feeding conveyer 31, the driving velocity of the feeding conveyer 31 being substantially the same as that of the fork conveyer 22 so as to transfer a new laminated assembly article 10 to the conveyer 22. The driving operation of the conveyer 22 is then stopped whereupon the fork 21 is moved forwardly toward the opening of the bag, and the insertion operation of the article 10 within the bag 1 is repeated.

In accordance with the automatic feeding means, the laminated article such as for example, glass plate, which is easily slidable and therefore easily broken, can be safely and accurately inserted within the bag, and the insertion operation can be efficiently repeated, it being especially possible to place the article within the bag slowly. In conjunction with the vacuum seal system utilizing the opening and closing means 40 disposed at both the insertion and discharge stations, the article 10 is inserted within the bag whereupon the rod 6 is moved toward the opposite side of the holder 15 so as to overlap both of the interior surfaces of the front and rear sheets 2 and 3 so as to close the opening of the bag whereupon the latter may be evacuated. Accordingly, the holder 15 should have a structure suitable for supporting the upper portion of the bag and is preferably a rod. Each of the holders 15 is supported upon a plurality of pegs disposed upon a rotary conveyer.

Turning then to FIG. 4, the vacuum seal and rotary conveyer systems are disclosed, the front portion of the bag 1 is fitted upon a pair of pegs 42 disposed upon an endless rotary conveyer 41, the holder 15 being disposed at the top of the pegs. Each of the rods 6 is secured to the upper end of the bag 1, by means of loops 4 (See FIG. 1) and is gradually raised by means of hooks 50 which have a compound movement which includes an initial horizontal component and a subsequent vertical component, whereupon the bag is opened while being maintained upon the pegs 42. The conveyer 41 and pegs 42 are stopped at a position at which the pegs extend in a horizontal direction, the bag 1 then being opened by means of hooks 50 so as to insert the article 10 therewithin. After insertion of the article 10 within the bag 1, the pegs 42 are moved by means of the conveyer 41 and when the pegs 42 are raised to a predetermined position, the hook 50 is disconnected from the rod 6.

When the pegs 42 reach a position vertically disposed above the loading or insertion station, as noted above, by further movement of the conveyer 41, the opening of the bag 1 is closed, due to the overlapping of the inner surface of the front and rear sheets of the bag and the opening is subsequently sealed. The air within the bag 1 is evacuated by means of a vacuum pump 43 which is suitably connected to port 8 of the bag. The vacuum pumps 43 are mounted upon the conveyer 41, whereby they may be actuated, by means of a switch, not shown, when the opening of the bag is closed, so as to evacuate the same. According to the sealing system, the bag can be airtight only by closing the upper end of the bag in the forenoted manner. The closing of the upper end of the bag can be easily accomplished by shifting the rod 6 into suitable contact or engagement with the holder 15, and consequently, the automatic operation of closing and opening of the bag can be easily conducted. Moreover, when the article is discharged after treatment, the bag can easily be returned from the vacuum condition to atmospheric pressure conditions by shifting the projecting rod 6 so as to release the contact between the front and rear sheets thereby opening the bag.

Within the apparatus of the present invention, each of the bags is usually fitted upon a peg conveyer or the like and the bag is circulated under the conditions wherein each of the ports for connecting the bags to vacuum pump is directly connected to the vacuum pump. A plurality of the bags 1 may be connected to one vacuum pump 43 depending upon the number of bags and the number of vacuum pumps available, and it is not unusual to connect 3 or 4 bags to one vacuum pump. In connecting the bags to the pumps, each of the switch valves 44 (See FIG. 8) is provided so that the vacuum pumps 43 connected to the bags within which articles have not been inserted, or within which articles have been inserted however the bags are retained in their open positions, aspirate atmospheric air, while only the vacuum pumps 43 connected to the closed bags containing the articles are operated to evacuate such bags. After evacuating the bags 1 by means of the vacuum pumps 43, the switch valve 44 may be disconnected, and in order to maintain the vacuum conditions within the bags 1, the auxiliary vacuum pump 45 can be suitably connected to the ports of the bags.

It should be noted that it is also possible to terminate the operation of the vacuum pumps connected to the bags which do not contain articles 10 or which contain such articles but are nevertheless in their open condition, without the utilization of switch valves 44, by means of directly connecting the pumps to the bags and deactivating or actuating the pumps accordingly. It should also be noted moreover, that only one vacuum pump 43 need be mounted upon the conveyer 41 because the pump may be connected to a plurality of distributors which are in turn connected to the bags. A switch valve 41 is then provided at each of the distributors so as to connect the vacuum pump 43 only with those bags containing the articles 10. In the foregoing modes therefore, the actuation and termination of the pressure reducing operation can be conducted by actuating and terminating the operation of the vacuum pump itself, or alternatively, it is possible to actuate the vacuum pumps continuously and to control the pressure reducing operation of the vacuum pumps by switching the valves connected thereto. It is thus preferable to provide a mechanism for controlling the operation as noted hereinabove, wherein the vacuum pumps are not actuated when the bags are at positions corresponding to an open mode, the pumps are actuated after the bags have been closed so as to retain the laminated assembly articles, and the vacuum operation is continued until the bags have moved to the discharge position at which position the vacuum operation is terminated.

Figure 6:
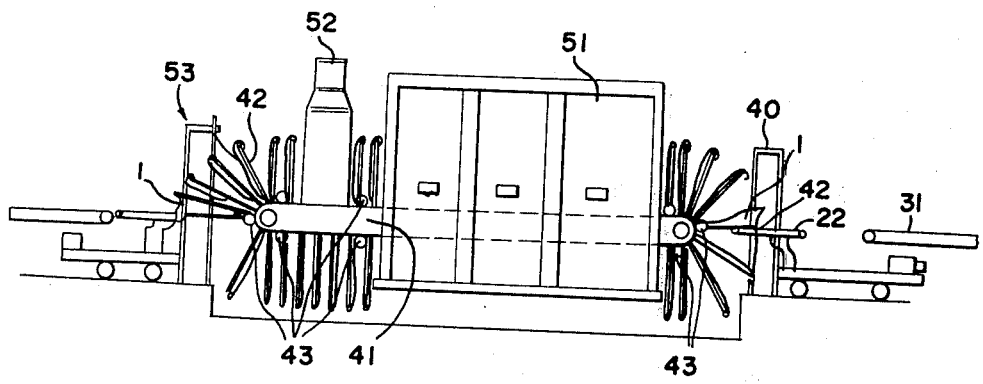
FIG. 6 is a schematic view of the present invention including the automatic feeding means, the heating furnace, and the pressure reducing conveyer.

Referring now to FIGS. 6 and 8, the bags containing the laminated assembly articles are secured upon the pegs of the conveyer 41 and are passed through the heating furnace 51, which is maintained at a desirable temperature, at a suitable velocity and for a specific time by movement of the conveyer, the heating temperature being preferably a temperature for imparting a desirable preliminarily bonding without deterioration of the bag. The bags are subsequently cooled at the cooling station 52 and are transferred to the discharging means 53 for discharging the laminated assemblies therefrom. The discharging means 53 has a structure similar to that of the feeding means and a mode of operation which is also quite similar thereto although such operates in a reverse manner than the feeding means.

Figure 7:
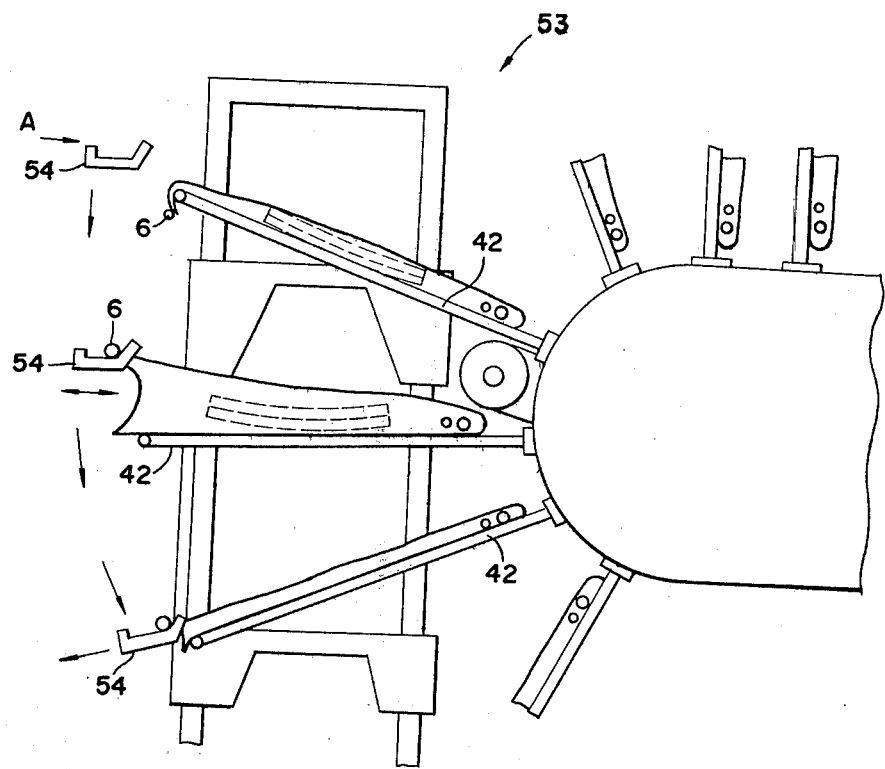
FIG. 7 is a schematic view of the automatic discharging means of the apparatus of the present invention.

As best seen from FIGS. 6 and 7, the article which is preliminarily pressed within the bag 1 and fitted upon the pegs 42 secured upon the conveyer 41, is removed from the bag by the discharging means 53, the rod 6 fitted to the upper portion of the bag 1 being raised by means of the horizontally and vertically movable hook 54 when the bag retained upon the pegs 42 has reached the predetermined position. The bag is thus opened and the fork of the automatic discharging means is moved forwardly within the bag and the article 10 is removed to the conveyer and withdrawn. After discharging the article 10, the hook 54 is disconnected from the rod 6 and the operation is repeated. While the automatic discharging means used for the operation of withdrawing the article can have the same structure as the feeding means, such of course is not necessarily limited to have the same structure. The laminated assembly article is subsequently carried by means of the conveyer so as to be heated within an autoclave for preparation of the laminated glass.

Thus it may be seen that the apparatus of the present invention for pressing the laminated assemblies has important advantages over the known prior art structures in that the present apparatus includes automatic feeding means for inserting the brittle glass plates safely and automatically in the bags, means for opening the bags easily and automatically, bag closing means for overlapping and closing the upper end of the bags, a conveyer having a plurality of bags and pressure reducing means associated therewith, and discharging means for removing the preliminarily bonded laminated assemblies which have been treated in a vacuum. The apparatus thereby provides an automatic vacuum pressing operation, which has heretofore been considered to be impossible, and exhibits increased safety and a decreased breakage rate, the manual labor also being substantially decreased while uniform quality control has been imparted thereto.

Obviously, many modifications and variations of the present invention are possible in light of the above teachings. It is to be understood therefore that within the scope of the appended claims the present invention may be practiced otherwise than as specifically described herein.

What is claimed as new and desired to be secured by letters patent of the United States is:

1. Apparatus for automatically pressing laminated assemblies comprising:

feeding means for automatically inserting said assemblies within bags secured to conveying means;

discharging means for automatically removing said laminated assemblies from said bags secured to said conveying means;

said conveyer means movably supporting a plurality of said bags between said feeding means, where said bags receive said laminated assemblies, and said discharge means, where said laminated assemblies are removed from said bags;

means provided at at least one side of said conveyer for automatically opening and closing said bags;

pressure reducing control means connected to said bags for inparting vacuum conditions within said bags during the time said bags are moved by said conveyer from said feeding means to said discharging means; and heating means for heating said bags under vacuum conditions during the time said bags are being moved by said conveyer from said feeding means to said discharge means.

2. The apparatus as set forth in claim 1, wherein:

said feeding means includes a reciprocating fork having a belt conveyer which is intermittently driven; and said fork and belt conveyer being capable of initially moving toward an open bag whereby one of said assemblies upon said fork conveyer may then be inserted within said bag by driving said fork conveyer in the direction toward said bag while said fork is returned in the opposite direction.

3. The apparatus as set forth in claim 1, wherein said conveyer is an endless conveyer having a plurality of pegs upon which said bags are supported.

4. The apparatus as set forth in claim 1, wherein said pressure reducing control means includes a plurality of vacuum pumps mounted upon said conveyer and respectively connected to one or more of said bags supported upon said conveyer.

5. The apparatus as set forth in claim 1, wherein said bag opening and closing means includes hook means which is capable of vertical and horizontal movement so as to appropriately engage a rod fitted to said bag so as to open or close said bag.

6. The apparatus as set forth in claim 1, wherein said heating means comprises a heating chamber for heating said bags containing said laminated assemblies when said bags are conveyed through said chamber by said conveyer means.

* * * * *